Patented Mar. 30, 1937

2,075,429

UNITED STATES PATENT OFFICE 2,075,429

PROCESS FOR PRODUCING VINYL RESINS

Stuart D. Douglas, Charleston, W. Va., assignor, by mesne assignments, to Union Carbide and Carbon Corporation, a corporation of New York No Drawing. Application June 15, 1934, Serial No. 730,726

7 Claims. (Cl. 260—2)

This invention is a process for producing vinyl resins by the polymerization of vinyl compounds. It has for its principal object the provision of a method which makes possible the production of vinyl resins of high average molecular weight in which a comparatively narrow band of polymers of different molecular aggregation is represented. This results in vinyl resins of uniform quality and is an end which has in the past been achieved by various treatments applied to the vinyl resins after their formation.

The process by means of which the object of this invention is attained broadly comprises conducting the polymerization of vinyl compounds by the aid of heat and a catalyst while maintaining the concentration of monomeric vinyl compounds substantially constant through the polymerization reaction. The process of this invention is simple, efficient and economical in operation. By means which I have discovered it can be operated continuously and this obviously enhances its value.

It has been found in the past that vinyl polymers of higher average molecular weight than were obtained by previously known methods could be produced if certain conditions were observed during the polymerization by which they were made. The extent of polymerization or the molecular weight of the polymers is evidenced in vinyl resins by their solubility characteristics, strength, softening point, stability and water resistance. For example, in E. W. Reid Patent No. 2,064,565, dated Dec. 15, 1936, it is shown that the best conditions for producing vinyl resins of high average molecular weight include a temperature for the reaction of less than 60° C., preferably 40° C. or less, and conducting the polymerization in the presence of a liquid medium which is a nonsolvent or a poor solvent for the vinyl resin being produced. Despite the advances in this direction which have been made, it has been observed that even when such improvements were effected, the resin produced contained polymeric aggregates of widely varying molecular weight, and it was necessary to treat the resin to eliminate the lowest and, in some cases, the highest polymers contained in the resin before a product was obtained of sufficiently uniform quality for the uses which have developed for vinyl resins.

The explanation for the presence of a wide band of polymers in the vinyl resins produced by previously known processes appears to be directly connected with the concentration of monomeric vinyl compounds present in the polymerization reaction. That is, polymerization proceeds to a degree which is directly proportional to the concentration of monomeric vinyl compounds present during reaction. In all previously known processes, it is quite clear that this concentration became progressively less as the polymerization proceeded. Hence the molecular size of the vinyl polymers produced decreased regularly throughout the polymerization reaction.

The present invention provides a process which obviates the difficulties which have been found to be inherent in prior processes. In its preferred form, the process of this invention comprises conducting the polymerization of vinyl compounds by the aid of heat and a catalyst in the presence of a liquid medium which is a solvent for the monomeric compounds, but which is a nonsolvent or a precipitant for the polymers formed. As the polymerization proceeds, the resin appears in the form of a powder suspended in the liquid medium. This powder is removed from the reaction system, substantially as rapidly as it is formed. This may be effected by circulating the liquid through a filter press or into a settling tank or salt box. Fresh monomeric vinyl compounds and additional catalyst if it is required are added to the reaction system to replace the materials consumed in the reaction and removed as polymers. By this means it is possible to keep the concentration of monomeric vinyl compounds in the polymerization reaction high and substantially constant, and as a result the resin produced is made up of a relatively narrow band of polymers of high average molecular weight. The removal of product and the addition of reactants may be carried out continuously so that the process is readily and conveniently practiced as a continuous cycle. The losses of material in this type of process are very small since the only unreacted vinyl compounds or liquid medium removed from the system are those small quantities present in the wet resin.

This process is satisfactory for the polymerization of many types of vinyl compounds. Among those which are suitable are the vinyl halides, especially the chloride; vinyl esters of aliphatic acids, particularly those of the lower fatty acids, such as the acetate, propionate, butyrate, formate and chloracetate; and vinyl benzene. Mixtures of vinyl compounds of the above groups may be conjointly polymerized by means of this process. It is obvious that it is also applicable to the production of resins from polymerizable vinyl compounds other than those named.

Liquid media suitable for use in the process are in general any which will dissolve the monomeric vinyl compounds which are to be polymerized, but which are nonsolvents for the polymers of those compounds. Examples of satisfactory media are the paraffin hydrocarbons such as butane, pentane, heptane and naturally occurring or artificially produced mixtures containing those hydrocarbons or their homologues. Aliphatic alcohols including ethyl and methyl alcohols, and aliphatic ethers, such as diethyl, diisopropyl, and dibutyl ethers, are also satisfactory media for the polymerization, excepting, of course, that the alcohols cannot be used as media for the polymerization of vinyl fatty acid esters, such as vinyl acetate, for these polymers are alcohol soluble.

The catalyst to be used in this process may be any of those known to aid the polymerization of vinyl compounds. Suitable catalysts may be selected from the organic peroxides, such is dibenzoyl peroxide, acetyl benzoyl peroxide, or diacetyl peroxide, and combinations of those substances with promoting agents, such as organic acids or their anhydrides, may be used. I prefer to conduct the polymerization at a temperature of about 30° to 40° C., but it is equally satisfactory when operated at temperatures which are either above or below this preferred range. The invention will be illustrated by the following examples:

*Example 1.*—A mixture of 96 parts by weight of vinyl chloride, 24 parts by weight of vinyl acetate, 480 parts by weight of butane and 1.2 parts by weight of acetyl benzoyl peroxide was heated at 30° C. in a lead-lined autoclave equipped with a pump for circulating its contents, and two filter presses piped in parallel. As the reaction proceeded, a finely divided polymer formed in the liquid butane which was forced continuously through one of the filter presses. This polymer was allowed to build up as a cake in one of the filter presses, the two of which were used alternately without interrupting the reaction. The resin, which was light in color and of excellent quality, was removed as a cake from the presses, dried and packed. As the polymerization proceeded, additional quantities of vinyl chloride, vinyl acetate and acetyl benzoyl peroxide were added at frequent intervals to maintain a substantially constant concentration of unreacted vinyl compounds in the autoclave.

*Example 2.*—A mixture of 120 parts by weight of vinyl chloride, 480 parts by weight of butane and 1.2 parts by weight of acetyl benzoyl peroxide was substituted for the reaction mixture used in Example 1. The polymerization was conducted in exactly the same way, and the white powdery vinyl chloride polymer was continuously removed by means of the filter presses while fresh quantities of vinyl chloride and catalyst were added at frequent intervals during the reaction.

The process of Example 2 can be modified by eliminating the butane and replacing it with additional vinyl chloride. In this case monomeric vinyl chloride serves as a precipitant for the polymer which is formed and the reaction proceeds as described in the example.

Other methods of carrying out the process of this invention are possible. For example, the concentration of monomeric vinyl compounds may be kept substantially constant throughout a polymerization reaction from which no polymer is withdrawn by adding to the reaction system fresh quantities of monomers to replace those converted to polymers. This method is limited in practical operation, and is less satisfactory than the preferred method described. It does, however, represent an advance over the prior art methods in which a constantly decreasing concentration of monomeric compounds is necessarily present in the reaction.

It will be clear that the process of this invention is susceptible of modification and such modifications are included within the invention as defined by the appended claims.

I claim:

1. Process for producing vinyl resins of high average molecular weight which comprises conducting the polymerization of vinyl compounds by the aid of heat and a catalyst in the presence of a medium which is a solvent for the monomeric vinyl compounds, but which is a nonsolvent for the polymers produced while maintaining the concentration of monomeric vinyl compounds substantially constant throughout the polymerization reaction, and removing the thus precipitated polymers from the reaction as they are formed.

2. Process for producing vinyl resins of high average molecular weight which comprises conducting the polymerization of vinyl compounds by the aid of a catalyst at a temperature of about 30° to about 40° C. in the presence of a medium which is a solvent for the monomeric vinyl compounds, but which is a nonsolvent for the polymers produced while maintaining the concentration of monomeric vinyl compounds substantially constant throughout the polymerization reaction by separating the thus precipitated polymers from said medium as they are formed, and removing them from the reaction.

3. Process for producing vinyl resins of high average molecular weight which comprises conjointly polymerizing a vinyl halide with a vinyl ester of an aliphatic acid in the ratio of about 4 to 1 by the aid of heat and a catalyst in the presence of a liquid which is a solvent for the monomeric vinyl compounds, but which is a nonsolvent for the polymers produced while maintaining the concentration of monomeric vinyl compounds substantially constant throughout the polymerization reaction by separating the thus precipitated polymers from said medium substantially as they are formed, and removing them from the reaction.

4. Process for producing vinyl resins of high average molecular weight which comprises conducting the polymerization of vinyl compounds by the aid of a catalyst at a temperature of about 30° to about 40° C. in the presence of a paraffin hydrocarbon while maintaining the concentration of monomeric vinyl compounds substantially constant throughout the polymerization reaction by separating the thus precipitated polymers from said hydrocarbon as they are formed and removing them from the reaction.

5. Process for producing vinyl resins of high average molecular weight which comprises conjointly polymerizing vinyl chloride and a vinyl ester of an aliphatic acid by the aid of a catalyst at temperatures of about 30° to about 40° C. in the presence of a liquid medium which is a solvent for the monomeric vinyl compounds but which is a nonsolvent for the polymers formed while maintaining the concentration of monomeric vinyl compounds substantially constant throughout the polymerization reaction by removing the thus precipitated polymers from the reaction substantially as they are formed.

6. Continuous process for producing vinyl resins of high average molecular weight which comprises conjointly polymerizing vinyl chloride with a vinyl ester of an aliphatic acid by the aid of a catalyst at a temperature of about 30° to about 40° C. in the presence of a medium which is a solvent for the monomeric vinyl compounds, but which is nonsolvent for the polymers produced; maintaining the concentration of monomeric vinyl compounds substantially constant throughout the reaction by separating the thus precipitated polymers from said medium continuously as they are formed; removing the polymers from the reaction; and supplying to the reaction additional quantities of monomeric vinyl compounds.

7. Continuous process for producing vinyl resins of high average molecular weight which comprises conjointly polymerizing about 4 parts by weight of vinyl chloride with about 1 part by weight of vinyl acetate by the aid of acetyl benzoyl peroxide catalyst at a temperature of about 30° C. in the presence of about 20 parts by weight of butane; continuously separating the thus precipitated polymer from the butane by filtration; and supplying additional monomeric vinyl chloride and vinyl acetate to the reaction.

STUART D. DOUGLAS.